US011952211B1

(12) United States Patent
Pietrini et al.

(10) Patent No.: US 11,952,211 B1
(45) Date of Patent: Apr. 9, 2024

(54) TAKE-BACK KIOSK

(71) Applicant: American RX Group, LLC, Eden Prairie, MN (US)

(72) Inventors: Michael J. Pietrini, Maple Grove, MN (US); Craig A. Whaley, Otsego, MN (US); Matthew A. Machesky, Saint Cloud, MN (US)

(73) Assignee: American RX Group, LLC, Eden Prairie, MN (US)

( * ) Notice: Subject to any disclaimer, the term of this patent is extended or adjusted under 35 U.S.C. 154(b) by 871 days.

(21) Appl. No.: 17/007,988

(22) Filed: Aug. 31, 2020

Related U.S. Application Data

(60) Provisional application No. 62/894,141, filed on Aug. 30, 2019.

(51) Int. Cl.
*B65F 1/16* (2006.01)

(52) U.S. Cl.
CPC .... *B65F 1/1615* (2013.01); *B65F 2001/1692* (2013.01); *B65F 2240/145* (2013.01)

(58) Field of Classification Search
CPC ............ A47G 29/1248; A47G 29/1251; A47G 29/20; A47G 29/22; A47G 29/12095; A47G 2029/1257; B65F 1/1615; B65F 2001/1692; B65F 2240/145
USPC .......................................................... 232/51
See application file for complete search history.

(56) References Cited

U.S. PATENT DOCUMENTS

| | | | | |
|---|---|---|---|---|
| 88,528 | A | | 3/1869 | Strang |
| 357,143 | A | | 2/1887 | Bush |
| 445,497 | A | | 1/1891 | Catudal et al. |
| 449,149 | A | | 3/1891 | Whelan |
| 450,379 | A | | 4/1891 | Sinclaire |
| 457,918 | A | | 8/1891 | Stevenson et al. |
| 462,093 | A | | 10/1891 | Downing |
| 464,275 | A | | 12/1891 | Cummings |
| 538,045 | A | | 4/1895 | Hueg |
| 693,532 | A | | 2/1902 | Pulver |
| 1,248,584 | A | * | 12/1917 | Williams et al. .. A47G 29/1209 43/67 |

(Continued)

FOREIGN PATENT DOCUMENTS

| | | | |
|---|---|---|---|
| EP | 1964786 | A1 | 9/2008 |
| EP | 2110095 | A1 | 10/2009 |

(Continued)

*Primary Examiner* — William L Miller
(74) *Attorney, Agent, or Firm* — Albert W. Watkins

(57) ABSTRACT

A controlled substance take-back kiosk has a housing that defines a secured internal kiosk storage vault. A vault door has an integrated doorjamb, and a pair of lock openings that each extend through multiple sheets of metal including both the doorjamb and door. The lock openings are shaped in the form of tapered cam-slots, and a rotating bolt arm pivots through these slots to draw the door and door jamb together. A hopper is selectively moveable between a normally closed position disallowing insertion of controlled substances into the housing interior and an open position allowing insertion of controlled substances. The hopper has an adjustable size opening with a smooth interior. A baffle has a curved cam surface that engages with the hopper, to accelerate closure of the baffle during opening of the hopper, to isolate the secured internal kiosk storage vault from the housing exterior.

20 Claims, 11 Drawing Sheets

(56) References Cited

U.S. PATENT DOCUMENTS

| | | | | |
|---|---|---|---|---|
| 2,114,623 | A | 4/1938 | Bergstein | |
| 2,364,012 | A | 11/1944 | Walton et al. | |
| 2,405,730 | A | 8/1946 | Bankson | |
| 2,973,138 | A | 2/1961 | Epstein | |
| 3,113,712 | A | 12/1963 | Kindseth | |
| 3,181,583 | A | 5/1965 | Lingenfelter | |
| 3,456,861 | A | 7/1969 | Wettlen | |
| 3,576,290 | A | 4/1971 | Marchisen | |
| 3,606,145 | A | 9/1971 | Davidson et al. | |
| 3,758,027 | A | 9/1973 | Morgan | |
| 3,802,619 | A * | 4/1974 | Vanderveer .......... | A47G 29/124<br>232/35 |
| 4,492,295 | A | 1/1985 | DeWoolfson | |
| 4,572,377 | A | 2/1986 | Beckett | |
| 4,824,261 | A | 4/1989 | Provost | |
| 4,872,588 | A | 10/1989 | Texidor | |
| 4,907,717 | A | 3/1990 | Kubofcik | |
| 4,969,596 | A | 11/1990 | Schulbaum | |
| 4,971,244 | A | 11/1990 | Friedman | |
| 5,048,692 | A | 9/1991 | Handler et al. | |
| 5,137,212 | A | 8/1992 | Fiterman et al. | |
| 5,156,294 | A | 10/1992 | Nichols | |
| 5,163,555 | A | 11/1992 | West et al. | |
| 5,339,959 | A | 8/1994 | Cornwell | |
| 5,407,277 | A | 4/1995 | Burke et al. | |
| 5,456,928 | A | 10/1995 | Hustad et al. | |
| 5,560,512 | A | 10/1996 | Hahn | |
| 5,695,113 | A | 12/1997 | Rau et al. | |
| 5,842,916 | A | 12/1998 | Gerrity | |
| 5,851,071 | A | 12/1998 | Arnell | |
| 5,950,919 | A | 9/1999 | Adams | |
| 6,003,666 | A | 12/1999 | Dougherty | |
| 6,012,844 | A | 1/2000 | Huseman et al. | |
| 6,050,485 | A | 4/2000 | Brito | |
| 6,062,001 | A | 5/2000 | Kunik | |
| 6,149,302 | A | 11/2000 | Taheri | |
| 6,416,221 | B2 | 7/2002 | Price | |
| 6,431,752 | B1 | 8/2002 | Diplock | |
| 6,719,195 | B2 * | 4/2004 | Farentinos ............. | A47G 29/22<br>232/47 |
| 6,808,108 | B1 | 10/2004 | Turnbow et al. | |
| 6,831,558 | B1 | 12/2004 | Andrew | |
| 6,879,255 | B1 | 4/2005 | Jezierski | |
| 6,918,534 | B2 * | 7/2005 | Fitzgibbons ....... | A47G 29/1207<br>232/50 |
| 7,254,873 | B2 | 8/2007 | Stolmeier et al. | |
| 7,320,427 | B2 * | 1/2008 | Prestwich .............. | A47G 29/22<br>232/51 |
| 7,428,980 | B2 | 9/2008 | Irwin et al. | |
| 7,686,207 | B1 * | 3/2010 | Jeffs ........................ | E05B 65/02<br>70/162 |
| 7,798,711 | B2 | 9/2010 | Plunkett et al. | |
| 7,843,340 | B2 | 11/2010 | Davis | |
| 8,163,045 | B2 | 4/2012 | Kunik et al. | |
| 8,195,511 | B2 | 6/2012 | Bowles et al. | |
| 8,220,703 | B2 | 7/2012 | Bolles | |
| 8,268,073 | B2 | 9/2012 | Kunik et al. | |
| 8,459,539 | B2 | 6/2013 | Bolles | |
| 8,573,473 | B1 * | 11/2013 | Farentinos ............. | A47G 29/22<br>232/51 |
| 8,960,530 | B2 * | 2/2015 | Silke ...................... | A47G 29/22<br>232/47 |
| 9,004,346 | B2 * | 4/2015 | Farentinos ............. | A47G 29/22<br>232/43.3 |
| 10,150,613 | B2 | 12/2018 | Kunik et al. | |
| 10,251,503 | B1 * | 4/2019 | Fulps ................. | A47G 29/1251 |
| 11,129,487 | B2 * | 9/2021 | Bolles .................... | A47G 29/30 |
| 2003/0222132 | A1 | 12/2003 | Esakov et al. | |
| 2005/0046567 | A1 | 3/2005 | Mortenson et al. | |
| 2005/0065640 | A1 | 3/2005 | Mallett et al. | |
| 2005/0216120 | A1 | 9/2005 | Rosenberg et al. | |
| 2007/0098305 | A1 | 5/2007 | Tilman | |
| 2007/0278140 | A1 | 12/2007 | Mallett et al. | |
| 2008/0044110 | A1 | 2/2008 | Garger | |
| 2008/0056622 | A1 | 3/2008 | Austreng et al. | |
| 2009/0043253 | A1 | 2/2009 | Podaima | |
| 2009/0271316 | A1 | 10/2009 | Kranyec | |
| 2010/0006636 | A1 * | 1/2010 | Frankenberg ........ | A47G 29/122<br>232/44 |
| 2010/0051152 | A1 | 3/2010 | McElaney et al. | |
| 2010/0127063 | A1 * | 5/2010 | Bolles .................... | A47G 29/22<br>29/434 |
| 2011/0209392 | A1 | 9/2011 | Kunik et al. | |
| 2012/0004761 | A1 | 1/2012 | Madruga | |
| 2012/0260566 | A1 | 10/2012 | Kunik et al. | |
| 2013/0061788 | A1 | 3/2013 | Kunik et al. | |
| 2013/0097920 | A1 | 4/2013 | Kunik et al. | |
| 2014/0131431 | A1 * | 5/2014 | Silke ...................... | A47G 29/22<br>232/30 |
| 2015/0021386 | A1 * | 1/2015 | Farentinos ............. | A47G 29/30<br>232/43.3 |
| 2015/0152348 | A1 | 6/2015 | Tusa et al. | |
| 2015/0297013 | A1 * | 10/2015 | Bolles .................. | A47G 29/124<br>29/434 |
| 2017/0127868 | A1 | 5/2017 | Adewuyi | |
| 2018/0039959 | A1 * | 2/2018 | Rodoni .................... | B65F 1/006 |
| 2019/0282013 | A1 * | 9/2019 | Bolles ................ | A47G 29/1251 |
| 2021/0186246 | A1 * | 6/2021 | Luckey ................ | A47G 29/141 |
| 2021/0292085 | A1 * | 9/2021 | Nelson .................... | B65F 1/006 |
| 2022/0022680 | A1 * | 1/2022 | Farentinos ............. | A47G 29/20 |

FOREIGN PATENT DOCUMENTS

| | | | |
|---|---|---|---|
| WO | WO 2011105990 | A2 | 9/2011 |
| WO | WO 2017196190 | A1 | 11/2017 |

* cited by examiner

TAKE-BACK KIOSK

CROSS REFERENCE TO RELATED APPLICATIONS

The present application claims the benefit of U.S. provisional patent application 62/894,141 filed Aug. 30, 2019 of like title and inventorship, the teachings and entire contents which are incorporated herein by reference.

BACKGROUND OF THE INVENTION

1. Field of the Invention

The present invention pertains generally to the field of medication disposal, including hazardous and prescription medications. More particularly, the present invention pertains to a secure, easy to use, governmental regulation compliant kiosk comprising a collection receptacle that facilitates convenient disposal of such medications.

2. Description of the Related Art

Medicine has always played a vital role in the life of humans. An appropriate treatment can literally make the difference between life and death. Early medicine relied heavily on plant and botanical based medications in the treatment of ailments. While a few of these medications could be hazardous or addictive if misused, the vast majority were relatively weak and non-addictive.

However, and in great contrast to early medications, for much of the past hundred years there has been a revolution in the formulation of medications. This has included both the identification and concentration of medicinal plants and botanicals, and the development and synthesis of medications that might not otherwise be available in nature. As a result, there has been an increased risk of accidental or intentional misuse of medications by persons other than the patient that can lead to great harm. Inconsideration thereof, many of these medications are only available by prescription, and a further subset are even more tightly controlled and regulated.

For some time, the only convenient way for an individual to permanently dispose of medications was disposal into household sewage and septic systems. Unfortunately, as the effectiveness of the medications has improved, so has the quantity of medication being released into ground and surface water. The amount of medication being disposed has risen to the point where both wildlife and even humans consuming treated water down stream are being exposed to undesirably high levels of medications. For exemplary and non-limiting example, some cancer medication molecules are too small to be filtered out even with very advanced and expensive municipal water filtration systems.

In consideration thereof, many years ago a system was implemented whereby a person could send their medications through the mail to an appropriate disposal site. Typically the disposal site would be a commercial incinerator facility, where the medications received would be destroyed through combustion, leaving only harmless ash as a residue. Since the US mail is quite secure, beginning with a mail box designed to resist tampering and through the mail handling enforcement of strict laws and strong penalties, such medications were expected to be delivered and disposed of in an efficient manner.

However, there were several deficiencies with this mail-back approach. One drawback is that a person would be required to first package and then pay postage to dispose of their medications, when they could instead simply flush them down the toilet or throw them in the trash for no additional cost and very minimal effort. A second drawback was inconsistent packaging by individuals, some packages which could fail during ordinary handling and transport. Another drawback was that there was no way to determine if a postal employee tampered with the mailed prescriptions. In some instances, such as when a stock prescription drug expires due to age on the shelf of a pharmacy, a substantial amount of a drug may require disposal. This expired prescription drug might be worth substantial money on the street, and might also be targeted by drug abusers or drug seekers. With ordinary postal packaging, there is no effective way to determine if the package has been tampered with prior to reaching the disposal facility. In addition, HIPPA compliance can be an issue with handling of the medications being mailed back, since patient identification is on the exterior envelope, and patient information and medication are listed on the medication containers.

A further improvement was the provision of kiosks and receptacles to law enforcement agencies. Pharmaceuticals and other substances can be dropped at the agency, where the substances are collected for ultimate shipment to a disposal facility. While this eliminates the need for postage, the law enforcement agencies are burdened with monitoring and access control. As may be easily appreciated, most law enforcement agencies already are overloaded with normal duties, and this collection function only increases the overall workload. Furthermore, this approach still fails to provide an effective way to determine if a package containing controlled substances has been tampered with prior to reaching the disposal facility. In addition, some of the medications can be quite hazardous if law enforcement personnel are accidentally exposed, creating an undesirable additional workplace hazard.

Recognizing the need for improved handing and disposal of medications, the US Government set forth new requirements. These new requirements have altered and improved the methods and apparatus used in the handing and disposal of medications.

An approach that has been adopted responsive to those new regulations is the provision of a secure kiosk, typically resembling a mailbox and incorporating many features similar thereto. A person may bring and drop their unused medications into a convenient kiosk. The medications in the kiosk are collected and subsequently removed therefrom for secure transport to a disposal facility or site.

For a kiosk to be effective, the medications must be securely received within the kiosk, meaning once they have been deposited into the kiosk, they should not be removable until appropriate personnel access the kiosk contents for transport to the disposal facility. This implies two critical requirements. The first is that there is not access to the kiosk contents from the inlet where a person will deposit the unused medications. The second is that the internal kiosk storage vault is secured with a lock that is not easily defeated.

A number of artisans have devised doors and hoppers that restrict access into the internal kiosk storage vault. Exemplary U.S. patents and published applications illustrating kiosks, the teachings which are incorporated herein by reference, include: U.S. Pat. No. 357,143 by Buse, entitled "Letter box"; U.S. Pat. No. 445,497 by Catudal et al, entitled "Letter box"; U.S. Pat. No. 449,149 by Whelan, entitled "Letter-box"; U.S. Pat. No. 457,918 by Stevenson et al, entitled "Street letter box"; U.S. Pat. No. 462,093 by Downing, entitled "Letter box"; U.S. Pat. No. 2,405,730 by Bankson, entitled "Mail Box Fitting"; U.S. Pat. No. 5,137, 212 by Fiterman et al, entitled "Security disposal cabinet with removal internal container particularly for recyclable confidential waste paper material"; U.S. Pat. No. 7,428,980 by Irwin et al, entitled "Parcel collection device"; U.S. Pat. No. 8,220,703 by Bolles, entitled "Secure mailbox for parcels and method of construction thereof"; U.S. Pat. No. 8,459,539 by Bolles, entitled "Secure deposit box and method of construction thereof"; 2012/0004761 by Madruga, entitled "Depository unit with user interaction"; and 2017/0127868 by Adewuyi, entitled "Smart delivery box with insulated compartment".

A number of artisans have also devised lock that is not easily defeated and that also restrict access into an internal storage vault. Exemplary U.S. patents and published applications illustrating these locks, the teachings which are incorporated herein by reference, include: U.S. Pat. No. 464,275 by Cummings, entitled "Street Letter Box"; U.S. Pat. No. 693,532 by Pulver, entitled "Receptacle or casing for vending machines"; U.S. Pat. No. 2,973,138 by Epstein, entitled "Coin receiver"; U.S. Pat. No. 3,606,145 by Davidson et al, entitled "Coin Box Device"; U.S. Pat. No. 3,758, 027 by Morgan, entitled "Mailbox"; U.S. Pat. No. 5,137,212 by Fiterman et al, entitled "Security disposal cabinet with removal internal container particularly for recyclable confidential waste paper material"; U.S. Pat. No. 6,808,108 by Trunbow et al, entitled "Mailbox security device"; and 2009/0271316 by Kranyec, entitled "Mailing kiosk with safeguards and methods of use".

Another ancillary issue with collection receptacles is determining when the receptacle is nearing a maximum content. At such point, the receptacle may be unable to accept more into the storage area, or, much worse in the case of the controlled medications, the receptacle may cease to function properly and thereby expose the contents of the secure vault. A number of exemplary U.S. patents and published applications illustrate level indicators and level detectors, the teachings which are incorporated herein by reference for incorporation into the present preferred and alternative embodiments, including: U.S. Pat. No. 4,971,244 by Friedman, entitled "Deposit, collection and delivery receptacle for clothing"; U.S. Pat. No. 5,695,113 by Rau et al, entitled "Mail indicator"; U.S. Pat. No. 5,950,919 by Adams, entitled "Remote mail delivery indicator system"; U.S. Pat. No. 6,050,485 by Brito, entitled "Apparatus for counting recyclable returnable item having an air tight trap door mechanism"; U.S. Pat. No. 6,831,558 by Andrew, entitled "Mailbox Operated signal device"; U.S. Pat. No. 6,879,255 by Jezierski, entitled "Mailboxcam instantaneous remote mail viewing system"; U.S. Pat. No. 7,428,980 by Irwin et al, entitled "Parcel collection device"; U.S. Pat. No. 7,843,340 by Davis, entitled "Mail delivery alert system"; and 2012/0004761 by Madruga, entitled "Depository unit with user interaction".

Other exemplary U.S. patents and published applications illustrating kiosks, the teachings which are incorporated herein by reference, include: U.S. Pat. No. 4,492,295 by DeWoolfson, entitled "Automated redemption center for metal containers"; U.S. Pat. No. 5,560,512 by Hahn, entitled "Anti-scavenging device for use with receptacles"; U.S. Pat. No. 5,842,916 by Gerrity, entitled "Method and apparatus for conditioning coins prior to discrimination"; U.S. Pat. No. 8,195,511 by Bowles et al, entitled "Secondary market and vending system for devices"; 2003/0222132 by Esakov et al, entitled "Mail collection bag"; 2005/0046567 by Mortenson et al, entitled "Method and system for utilizing multiple sensors for monitoring container security, contents and condition"; 2005/0065640 by Mallett et al, entitled "Methods of sorting waste"; 2005/0216120 by Rosenberg et al, entitled "Automatic vending machine and method"; 2007/0278140 by Mallett et al, entitled "Restricted access waste sorting system"; and 2015/0152348 by Tusa et al, entitled "Systems and methods for collecting, transporting and repurposing or destroying unused pharmaceuticals".

In addition to the aforementioned concerns, and as evident from the aforementioned patents and published applications, the apparatus and method of periodic collection varies greatly among the different kiosk designs. Of great concern is the provision of security and evidence of tampering with the collected medications. Handling of medications is regulated by DEA Federal Regulations, and can further be affected by other regulations and guidelines as well, including HIPPA regulations, because the patient information and type of medication are each listed on prescription containers.

Sometimes in cooperation with the kiosk, a few of the aforementioned artisans and a number of others have considered receiving and transporting hazardous materials in a "bag-in-a-box" to address some of these concerns. Exemplary "bag-in-a-box" U.S. patents and published applications, the teachings which are incorporated herein by reference, include: U.S. Pat. No. 4,907,717 by Kubofcik, entitled "Low-level radiation waste management system"; U.S. Pat. No. 4,969,596 by Schulbaum, entitled "Infectious waste disposal container"; U.S. Pat. No. 5,163,555 by West et al, entitled "Hazardous waste disposal container"; U.S. Pat. No. 6,003,666 by Dougherty, entitled "Method and apparatus for storing and shipping hazardous materials"; U.S. Pat. No. 8,268,073 by Kunik et al, entitled "System and method for making cement and cement derived therefrom"; U.S. Pat. No. 10,150,613 by Kunik et al, entitled "Packaging designed to be a fuel component and methods for making and using same"; 2013/0061788 by Kunik et al, entitled "System and method for making cement and cement derived therefrom"; and 2013/0097920 by Kunik et al, entitled "System and method for making cement and cement derived therefrom".

A number of other artisans have designed containers for more diverse application of the "bag-in-a-box" approach. Exemplary U.S. and foreign patents and published applications, the teachings which are incorporated herein by reference, include: U.S. Pat. No. 2,114,623 by Bergstein, entitled "Method of providing for internal atmospheric expansion of filled bags and hermetically sealing same"; U.S. Pat. No. 2,364,012 by Walton et al, entitled "Container"; U.S. Pat. No. 3,113,712 by Kindseth, entitled "Transporting and dispensing container"; U.S. Pat. No. 3,456,861 by Wettlen, entitled "Package comprising a thin bag and a double-folded stiffening inserted into the body of the bag, and the procedure for the production of this package"; U.S. Pat. No. 3,576,290 by Marchisen, entitled "Bag in abox for frozen eggs or the like"; U.S. Pat. No. 4,872,588 by Texidor, entitled "Lined carton"; U.S. Pat. No. 5,156,294 by Nichols, entitled "Foldable box with internal bag"; U.S. Pat. No. 6,416,221 by Price, entitled "Thermoplastic bag with offset fastener"; and U.S. Pat. No. 7,798,711 by Plunkett et al, entitled "Flexible liner for FIBC or bag-in-box container systems".

A number of bags with reclosable fasteners and an adhesive flap are known. Exemplary U.S. and Foreign patents and published applications, the teachings which are incorporated herein by reference, include: U.S. Pat. No. 5,048, 692 by Handler et al, entitled "Bag closure structure in which a single resealable closure acts as both the primary and secondary closures"; U.S. Pat. No. 5,456,928 by Hustad et al, entitled "Tamper-evident, flexible, reclosable package"; U.S. Pat. No. 6,149,302 by Taheri, entitled "Plastic bag with tamper-evident closure"; U.S. Pat. No. 7,254,873 by Stolmeier et al, entitled "Scored tamper evident fastener tape"; 2007/0098305 by Tilman, entitled "Slider end stop for a reclosable bag and methods"; 2008/0044110 and WO 2006/037240 by Garger, entitled "Paper or plastic bag"; 2008/0056622 by Austreng et al, entitled "Resealable package with tamper-evident structure and method for making same"; 2010/0051152 by McElaney et al, entitled "Disposable protector for electronic devices"; EP 1,964,786 by Doue, entitled "Bag adapted for manual filling and sealing"; and EP 2,110,095 by Duerrbeck et al, entitled "Bag, in particular for taking up contaminated objects".

Additional U.S. and Foreign patents and published applications of varying relevance, the relevant teachings and contents which are incorporated herein by reference, include: 88,528 by Strong, entitled "Letter Box"; U.S. Pat. No. 450,379 by Sinclaire, entitled "Letter Box"; U.S. Pat. No. 538,045 by Hueg, entitled "Letter Box"; U.S. Pat. No. 3,181,583 by Lingenfelter, entitled "Reclosable plastic container"; U.S. Pat. No. 4,572,377 by Beckett, entitled "Packaging structure"; U.S. Pat. No. 4,824,261 by Provost, entitled "Reclosable bag and hook and loop sealing strips for use therein"; U.S. Pat. No. 5,339,959 by Cornwell, entitled "Disposable medical waste bag"; U.S. Pat. No. 5,407,277 by Burke et al, entitled "Tamper evident bag with auxiliary bag"; U.S. Pat. No. 5,851,071 by Arnell, entitled "Plastic bag with permanent sealing zipper"; U.S. Pat. No. 6,012,844 by Huseman et al, entitled "Selectively closeable plastic film bag"; U.S. Pat. No. 6,062,001 by Kunik, entitled "Sharps disposal container"; U.S. Pat. No. 6,431,752 by Diplock, entitled "Plastic coin transport bag"; U.S. Pat. No. 8,163,045 by Kunik et al, entitled "Method and system of making a burnable fuel"; 2009/0043253 by Podaima, entitled "Smart medical compliance method and system"; 2011/0209392 and WO 2011/105990 by Kunik et al, entitled "Coated particulate and shaped fuels and methods for making and using same"; and 2012/0260566 by Kunik et al, entitled "Systems of making a burnable fuel".

It is noteworthy that if a medication container drops outside of the liner bag in the interior of the kiosk, and presuming the persons managing the kiosk respond according to the letter of the law, this displaced medication container will trigger a hazmat event requiring a special hazmat team to come to the site and move the displaced medication container into the liner bag. As may be appreciated, triggering the need for hazmat intervention is both very time consuming and very expensive. Further, the presence of the hazmat team can be very disruptive and harmful to a business such as retail pharmacy, since customers will likely divert from entering the pharmacy and may mistakenly assume that the business is not operating in a safe manner.

Even though modern kiosks have offered much advantage over the previous methods and apparatus, there is still undesirable opportunity for failure. Since each failure is procedurally required to trigger a hazmat intervention or even a DEA investigation, even if the failure rate is quite small such failures will multiply the actual cost of each kiosk.

As may be apparent then, in spite of the enormous advancements and substantial research and development that has been conducted, there still remains a need for an improved secure and governmentally compliant kiosk for receiving and holding prescription medications.

In consideration thereof, and in addition to the aforementioned patents and published applications, in our co-pending application Ser. No. 16/556,949, entitled "Take-Back Liner and Take-Back Kit Therefrom" and filed on Aug. 30, 2019, the teachings and contents which are incorporated herein by reference, we disclose a preferred box and liner bag. While that box and liner bag may be used with other kiosks known in the prior art, these may also be used together with the present invention for particular synergistic benefit as will become apparent from the descriptions of preferred and alternative embodiments herein below.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a controlled substance take-back kiosk. The take-back kiosk has a housing defining an exterior space and an interior space. The interior space has a secured internal kiosk storage vault. A hopper is selectively moveable between a normally closed position disallowing insertion of controlled substances into the housing interior space and an open position allowing insertion of controlled substances into the housing interior space. At least one hopper baffle pin is coupled with the hopper and moveable therewith. A hopper baffle obstructs access through the hopper to the secured internal kiosk storage vault while the hopper is in the open position and allows discharge of objects from the hopper to the secured internal kiosk storage vault when the hopper is in the normally closed position. A non-linear baffle cam surface is rigidly affixed with the hopper baffle and configured to engage with the at least one hopper baffle pin so that rotation of the hopper drives movement of the hopper baffle pin, which in turn pivots the hopper baffle in an amount determined by a slope of the non-linear baffle cam surface in contact with the at least one hopper baffle pin.

In a second manifestation, the invention is a controlled substance take-back kiosk. The take-back kiosk has a housing defining an exterior space and an interior space and a vault doorjamb. The interior space has a secured internal kiosk storage vault and the vault doorjamb has at least one door jamb cam slot. A hopper is selectively moveable between a normally closed position disallowing insertion of controlled substances into the housing interior space and an open position allowing insertion of controlled substances into the housing interior space. A baffle obstructs access through the hopper to the secured internal kiosk storage vault while the hopper is in the open position and allows discharge of objects from the hopper to the secured internal kiosk storage vault when the hopper is in the normally closed position. A vault door is moveable between a normally closed position disallowing access to the secured internal kiosk storage vault, and an open position allowing access to the secured internal kiosk storage vault. The vault door has at least one door cam slot. At least one lock has a rotating bolt arm that swings into the at least one door jamb cam slot and into the at least one door cam slot. The at least one lock is thereby configured to secure the vault door in the normally closed position.

In a third manifestation, the invention is a prescription medication take-back kiosk. The take-back kiosk has a housing defining an exterior space and an interior space and a vault doorjamb. The interior space has a secured internal kiosk storage vault. The vault doorjamb has at least one door jamb cam slot. A hopper is selectively moveable between a normally closed position disallowing insertion of controlled substances into the housing interior space and an open position allowing insertion of controlled substances into the housing interior space. At least one hopper baffle pin is coupled with the hopper and moveable therewith. A hopper baffle obstructs access through the hopper to the secured internal kiosk storage vault while the hopper is in the open position and allows discharge of objects from the hopper to the secured internal kiosk storage vault when the hopper is in the normally closed position. A non-linear baffle cam surface is rigidly affixed with the hopper baffle and configured to engage with the at least one hopper baffle pin so that rotation of the hopper drives movement of the hopper baffle pin, which in turn pivots the hopper baffle in an amount determined by a slope of the non-linear baffle cam surface in contact with the at least one hopper baffle pin. A vault door is moveable between a normally closed position disallowing access to the secured internal kiosk storage vault, and an open position allowing access to the secured internal kiosk storage vault. The vault door has at least one door cam slot. At least one lock has a rotating bolt arm that swings into the at least one door jamb cam slot and into the at least one door cam slot. The at least one lock is thereby configured to secure the vault door in the normally closed position.

OBJECTS OF THE INVENTION

Exemplary embodiments of the present invention solve inadequacies of the prior art by providing a controlled substance take-back kiosk having a vault door with an integrated doorjamb, a lock opening that extends through multiple sheets of metal and which is shaped in the form of a tapered cam-slot, a hopper having an adjustable opening size with a smooth interior, and a three-dimensional baffle geometry also having a curved cam surface that engages with the back of the hopper.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a DEA, HIPPA, and other governmental agency compliant controlled substance take-back kiosk. A second object of the invention is to provide such a kiosk that is simultaneously secure and that provides clear evidence in the event of illicit tampering. Another object of the present invention is to provide doors and hoppers that only allow medications being deposited into the kiosk a one-way travel path directly into the secured internal kiosk storage vault, preventing both removal and visual access. A further object of the invention is to provide a lock that restricts access into an internal storage vault, the lock which is not defeated without much noise and disruption, and which leaves clear and unmistakable evidence of tampering. Yet another object of the present invention is to determine when the receptacle is nearing a maximum capacity, and signaling the same while preventing further use until the kiosk is emptied.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
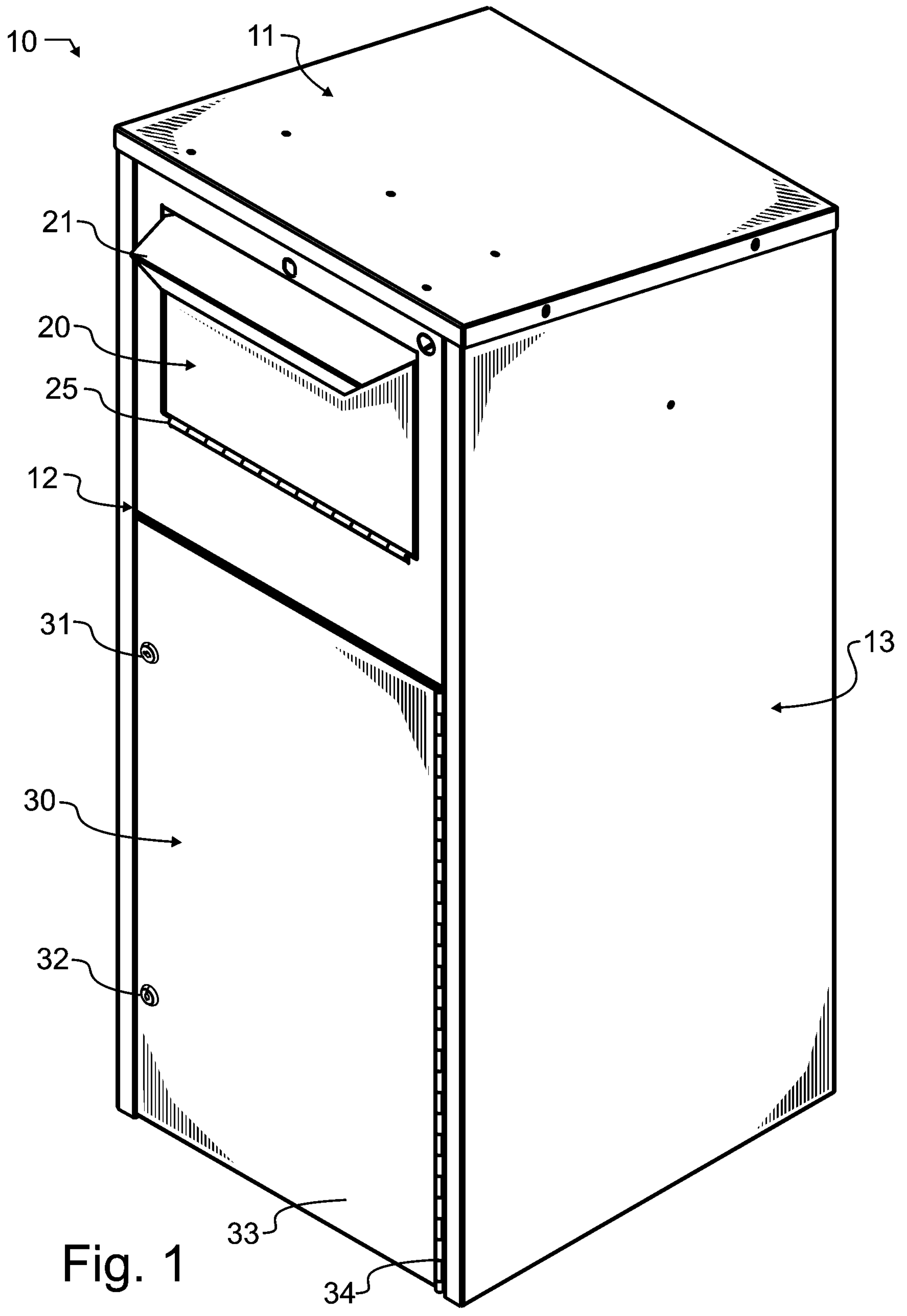
FIGS. 1-5 illustrate the preferred embodiment kiosk designed in accord with the teachings of the present invention from projected, front, bottom, side, and top views, respectively.

Manifested in the preferred embodiment illustrated in FIGS. 1-9, the present invention provides a controlled substance take-back kiosk 10 having a generally rectangular parallelepiped housing defined by six sides: top 11; front 12, right side 13, left side 14, back 15, and bottom 16. While the geometry of the housing is not critical to the present invention, this rectangular parallelepiped geometry provides a preferred combination of efficient space utilization and opportune arrangement of components as will be appreciated from the following description.

Attached into the front side 12 are hopper 20 and vault door 30. Kiosk 10 is designed to receive and retain medications, securing them from access by any unauthorized persons.

Incorporated into preferred embodiment kiosk 10 there are a number of features designed to prevent unauthorized persons from accessing the contents of secured internal kiosk storage vault 18. The first apparatus provided to prevent unauthorized persons from accessing the contents of kiosk 10 is hopper 20. Hopper 20 is normally closed, blocking access to the interior of kiosk 10.

However, when hopper handle 21 is manually pulled, hopper 20 is designed to open sufficiently to receive excess, old or expired medications from a person exterior to kiosk 10, who will ordinarily drop or slip the medications into hopper 20. When hopper 20 is subsequently manually closed, or released which due to the forces of gravity will also lead to closure, a bottom surface of hopper 20 will rotate sufficiently to discharge the medications into an internal liner for disposal. Hopper 20 includes a baffle 22 that obstructs any line of contact to secured internal kiosk storage vault 18 while hopper 20 is in any position other than closed, or almost immediately closed. In conjunction with hopper lid stop 24 and hopper baffle 22, in the preferred embodiment there is no direct access to the contents of the kiosk from hopper 20. Most preferably in any alternative embodiments, access to secured internal kiosk storage vault 18 will be sufficiently minimized that, for a given location of kiosk 10 such as within a retail store, pharmacy, or police station it will be very apparent if a person attempts to access or see into the vault.

The second apparatus provided to prevent unauthorized persons from accessing the contents of kiosk 10 is vault door 30 which is secured in place by two locks 31, 32, and a hinge 34. Both upper lock 31 and lower lock 32 are provided with a rotating bolt arm 36 that is best visible in FIGS. 6-8. Bolt arm 36 swings with key rotation into a cam slot 35 that is incorporated into door jamb 17 to lock door 30. Cam slot 35 includes both a slot 35*a* on one side of the U- or V-shaped door jamb 17 and a second slot 35*b* on the other leg of the U- or V-shaped door jamb 17. In the locked position, bolt arm 36 will also extend through a door cam slot 39 within inside door panel 33 and front 12, intermediate between cam slots 35*a-b*. Since there is very little distance between cam slots 35*a-b* within doorjamb 17, and these cam slots 35*a-b* surround door cam slot 39, there is very little leverage created by someone trying to pry apart door panel 33 from door jamb 17. Essentially, in order to pry open door 30, a would-be thief must shear bolt arm 36, and there is almost no force transmitted back to the lock body. This effectively prevents the forcing of either of locks 31, 32 with an ordinary prying instrument. In contrast, a prior art lock body with rotary bolt arm such as illustrated in the lock patents incorporated herein above, including U.S. Pat. No. 693,532 by Pulver; U.S. Pat. No. 2,973,138 by Epstein; U.S. Pat. No. 3,606,145 by Davidson et al; U.S. Pat. No. 3,758,027 by Morgan; U.S. Pat. No. 5,137,212 by Fiterman et al; U.S. Pat. No. 6,808,108 by Trunbow et al; and 2009/0271316 by Kranyec; will be pulled out of the door panel if the door is pried.

While in preferred embodiment kiosk 10, doorjamb 17 is folded and surrounds door panel 33 in the vicinity of doorjamb cam slots 35*a-b* and door cam slot 39 when door panel 33 is closed, in some alternative embodiments door panel 33 will terminate with a “U” or “V” shaped edge that surrounds doorjamb 17. In such embodiments, there will be two door cam slots 39, and one door jamb cam slot 35.

Cam slot 35 is shaped to provide increased tolerance when starting to lock door panel 33 and front 12, meaning door panel 33 does not need to be tightly closed to start locking the door. As a person continues to rotate the key in either of upper or lower locks 31, 32, this will draw door panel 33 farther into doorjamb 17 preferably bringing door panel 33 into snug contact with doorjamb 17. This is achieved by tapering door cam slot 35 from the relatively wider insertion point 37 to a narrower and inset position 38, meaning that one or more of cam slots 35*a*, 35*b*, 39 are wider on one end and narrower on the other. This means that as bolt arm 36 enters cam slots 35*a*, 35*b*, 39 at wider insertion point 37, there is plenty of play or freedom between the slots and bolt arm 36 that permits relative movement between door panel 33 and door jamb 17. As bolt arm 36 rotates from the wider portion of cam slots 35*a*, 35*b*, 39 into the narrower and inset position 38, there is little if any free space for play or freedom between the slots and bolt arm 36, which ensures that door panel 33 will be pulled snugly adjacent to door jamb 17 as bolt arm 36 rotates through cam slot 35. Most preferably, when either of upper or lower locks 31, 32 are fully rotated, door panel 33 is pulled into tight alignment with adjacent front 12. This provides visual confirmation of proper closure and locking.

In some alternative embodiments, bolt arm 36 is relatively thinner at greater radius, such that it will insert into cam slots 35*a*, 35*b*, 39 even when door panel 33 and door jamb 17 are slightly offset. Through continued rotation of the lock, which extends bolt arm 36 farther into cam slots 35*a*, 35*b*, 39, the thicker portion of bolt arm 36 will draw door panel 33 and door jamb 17 together. In some of these alternative embodiments, cam slots 35*a*, 35*b*, 39 do not vary in opening width, and instead the varying thickness of bolt arm 36 is solely relied upon. In others of these alternative embodiments, bolt arm 36 has the aforementioned decreasing thickness with increasing radius, and cam slots 35*a*, 35*b*, 39 vary in opening width between wider insertion point 37 and narrower and inset position 38.

The third apparatus optionally provided to prevent unauthorized persons from accessing the contents of kiosk 10 is anchoring of the bottom 16 to some fixed or static structure such as a concrete floor. This can be achieved by chain, u-bolt, bolts, or cable that passes though the bottom of 16 to permanently, or semi-permanently, attach kiosk 10 to a fixed location. In alternative embodiments, the anchor as described above can be placed through the back 15, right side 13, or left side 14 of kiosk 10. However, the permanent attachment of kiosk 10 to a location may not be required when the weight of the construction materials is sufficient to prevent manual removal from a secured location, and may not then be required by local, or federal requirements. Further, in some instances kiosk 10 is located within an otherwise secured building, such as a police station or pharmacy, preventing would-be thieves from gaining access to the kiosk without being observed or triggering other alarms.

Upper lock 31 and lower lock 32 may have identical keys, or may instead have dissimilar keys. If the keys are dissimilar, than anyone attempting to open the kiosk 10 would have to have both keys present to open the door 30, which may act as a redundant safety feature, and prevent unauthorized access to the contents of kiosk 10. One of the keys can then be held by an authorized person such as the police, sheriff, heath care official, or store manager, and the second key can be held by a shift manager, pharmacist, or department employee. This splitting of keys can help ensure compliance with statutory requirements of the number and type of persons who need to be present when removing medications from within secured internal kiosk storage vault 18 inside of kiosk 10.

During general public use and operation, a person deposits its expired or unwanted medication into kiosk 10 by opening hopper 20. The person will pull hopper handle 21 away from front 12 and thereby rotate hopper 20 about hopper hinge 25. When handle 21 is pulled to open hopper 20, and hopper 20 pivots about hopper hinge 25, hopper baffle pins 23 will also move toward and preferably almost immediately engage with hopper baffle 22. Continued rotation of hopper 20 translates into continued movement of hopper baffle pins 23 and consequent rotation of hopper baffle 22 about hopper baffle hinge 27. Eventually the bottom of hopper 20 moves upward to either make contact with or stops just short of contacting the bottom of hopper baffle 22. This combined movement closes the back side of hopper 20 and prevents objects from passing into secured internal kiosk storage vault 18 or persons from seeing into or accessing a receptacle therein.

Figure 6:
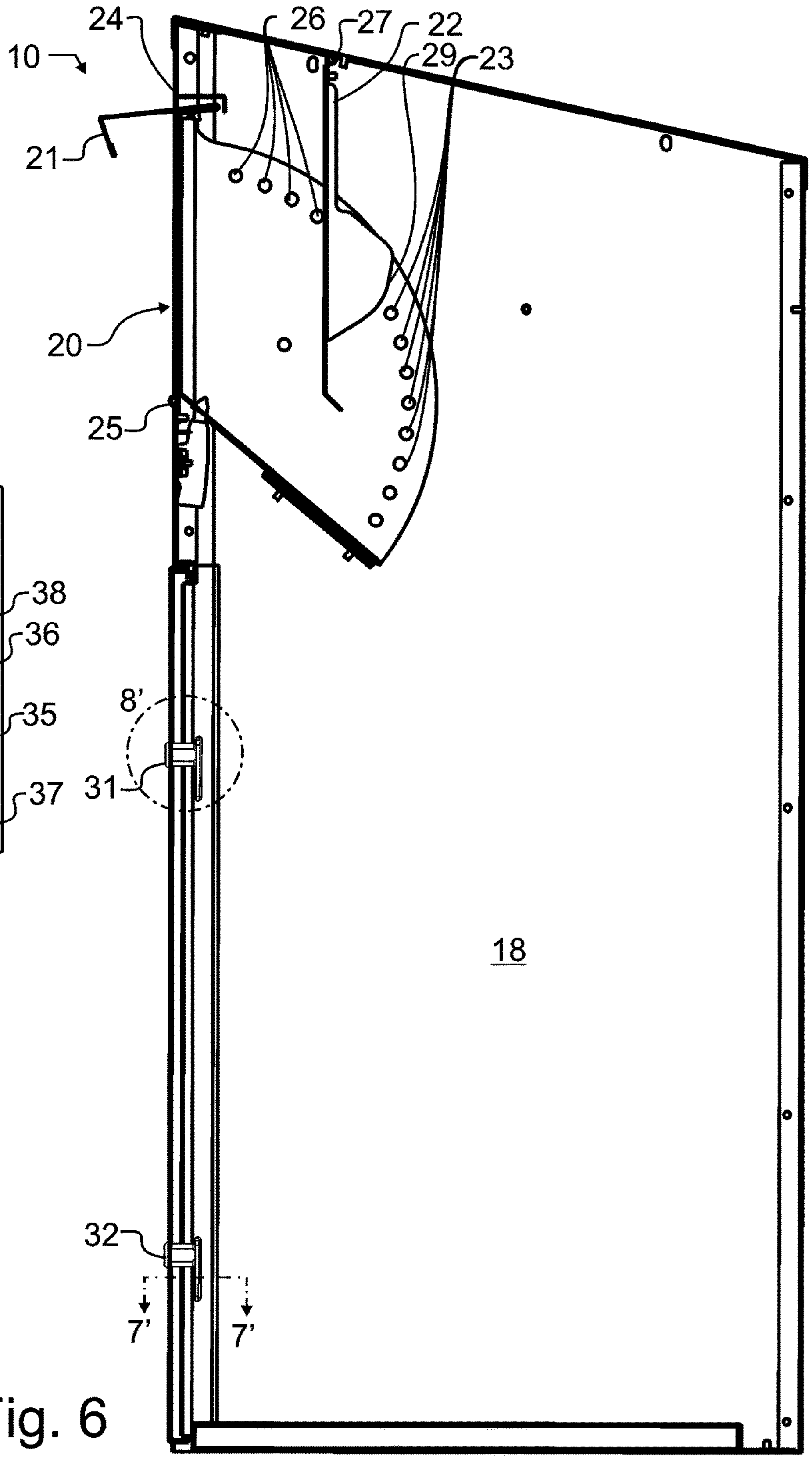
FIG. 6 illustrates the preferred embodiment kiosk of FIGS. 1-5 from a side view with the side, top and back panels removed.
Figure 9:
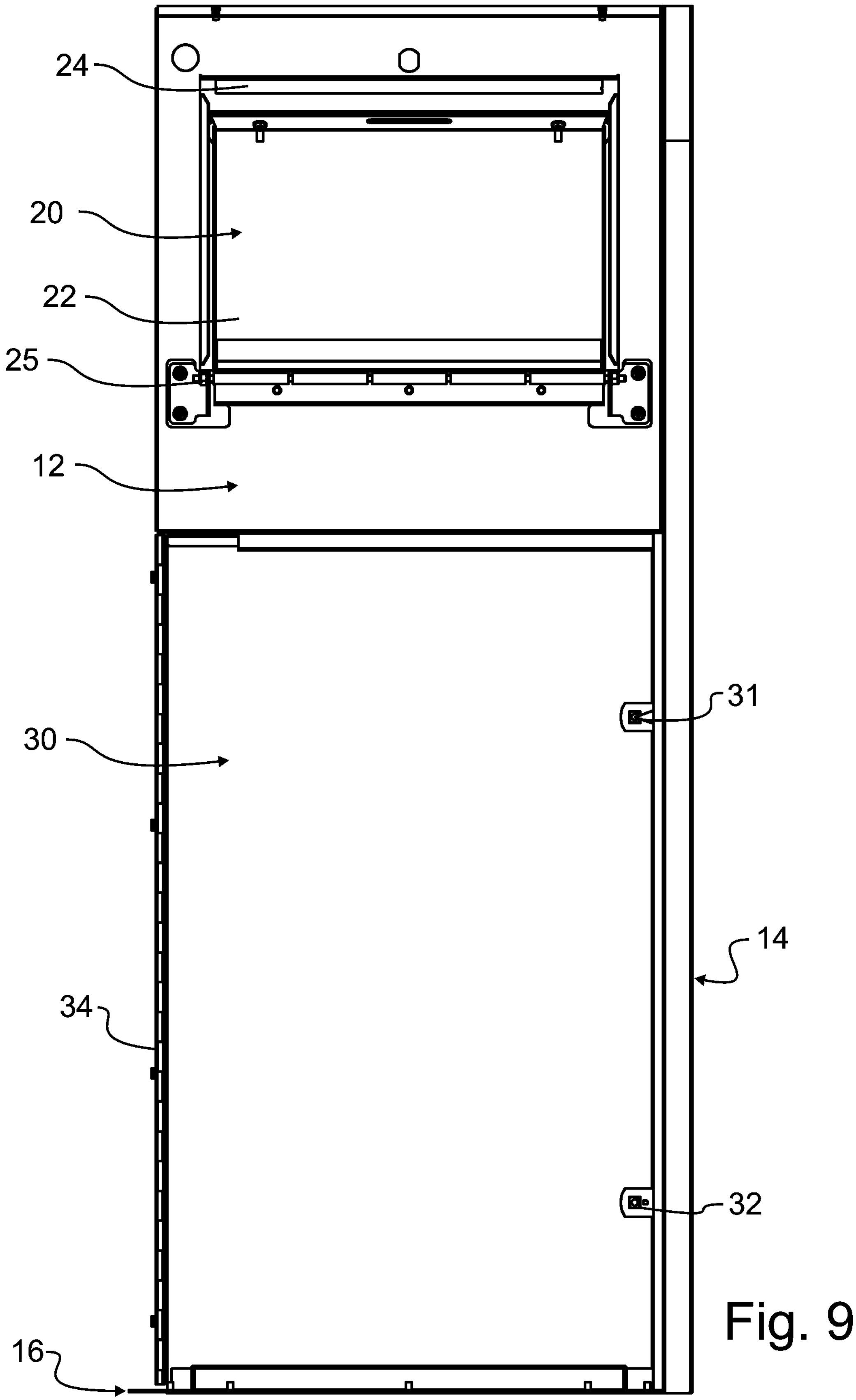
FIG. 9 illustrates the preferred embodiment kiosk from a back view with the side, top and back panels removed.
Figure 10:
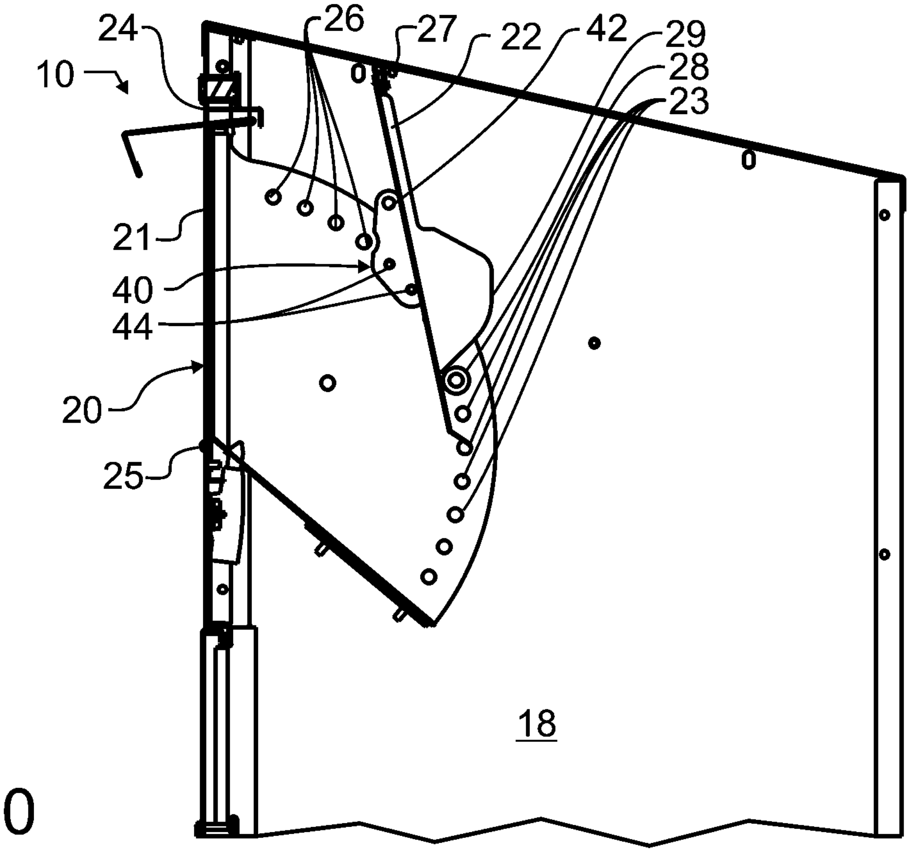
FIGS. 10-13 illustrate the preferred embodiment kiosk of FIGS. 1-9 from a sectioned and enlarged view taken along section line 10' in FIG. 2, illustrating sequential opening of the intake hopper and with slight modification made to the hopper.
Figure 11:
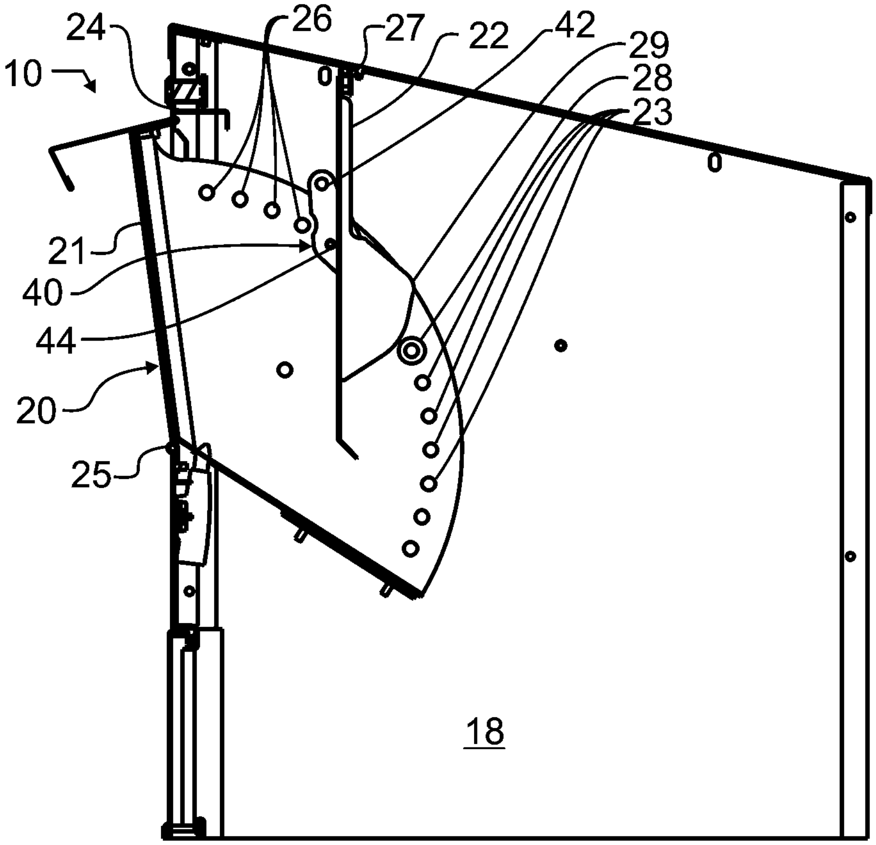
Figure 12:
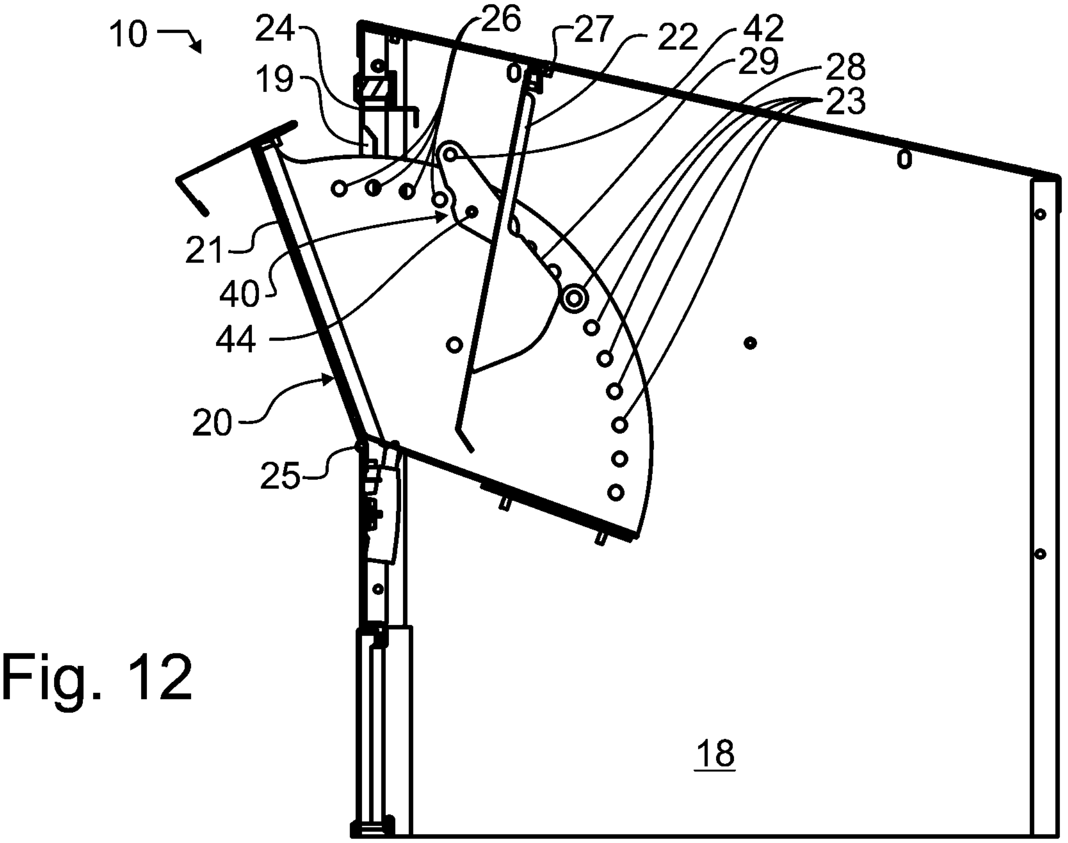
Figure 13:
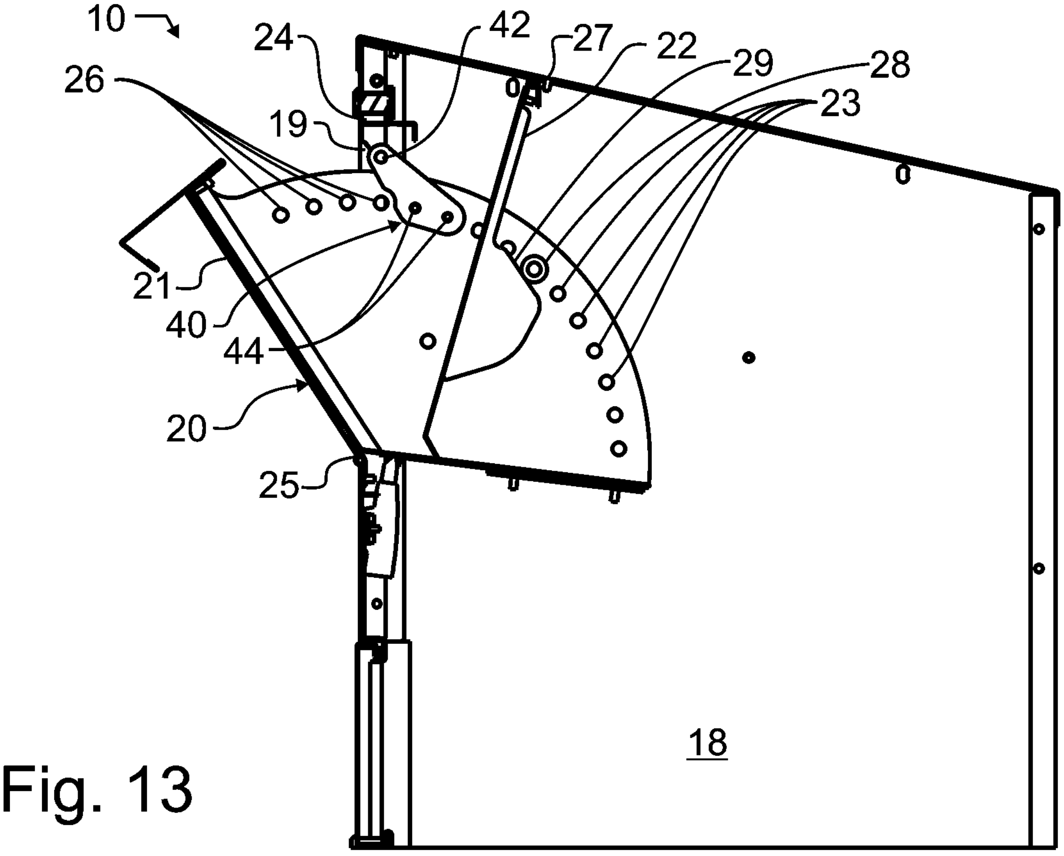
Figure 14:
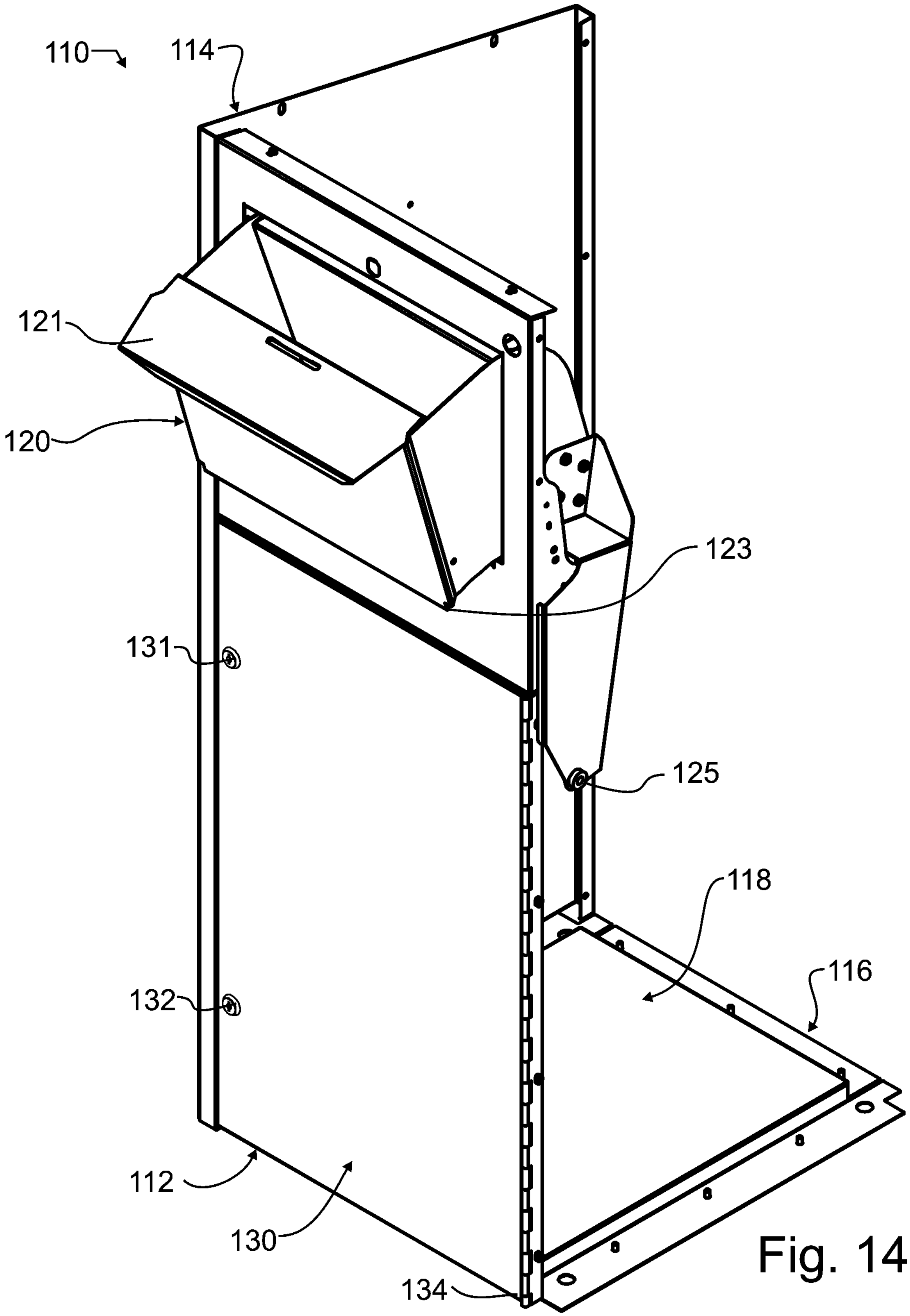
FIG. 14 illustrates an alternative embodiment kiosk from a projected view with the side, top and back panels removed.
Figure 15:
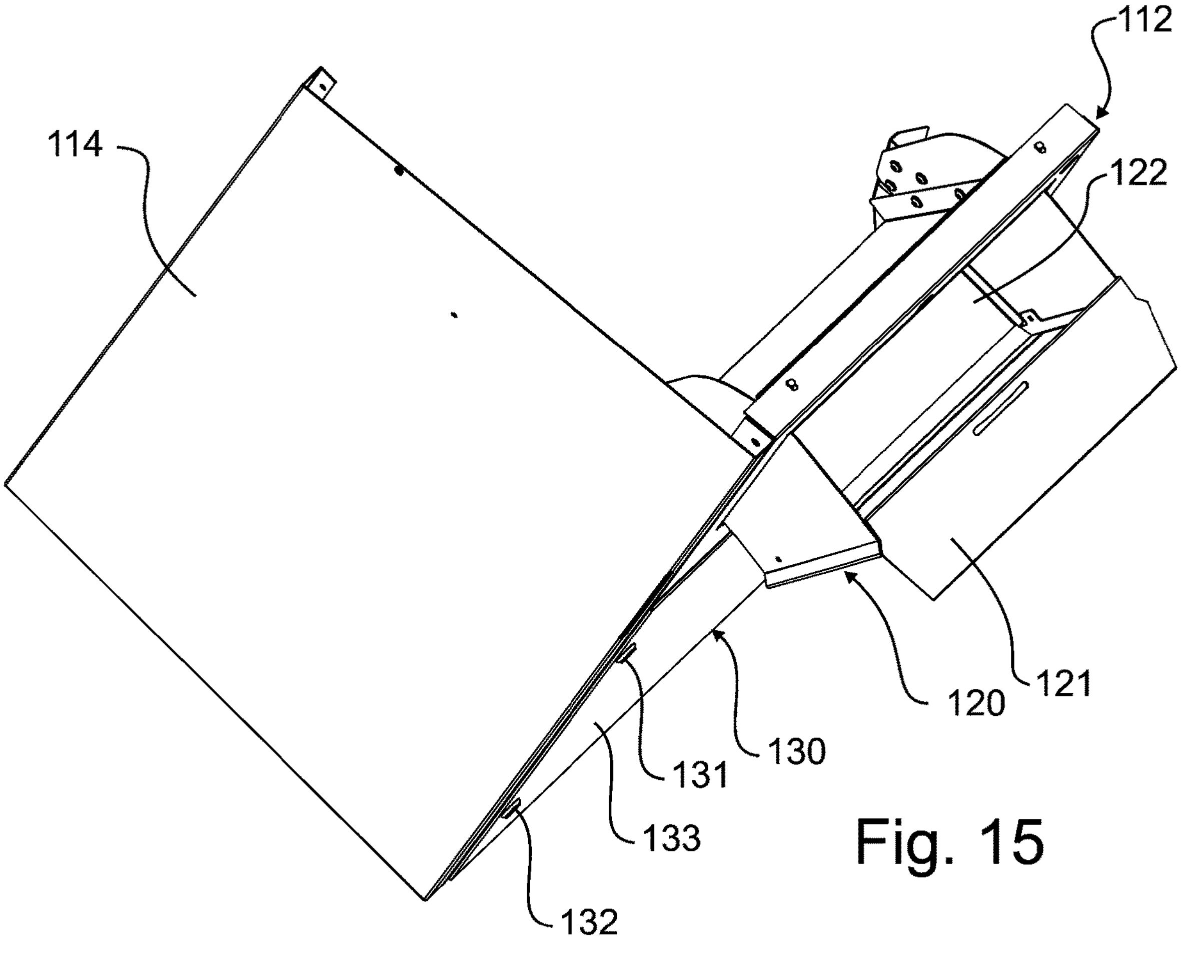
FIG. 15 illustrates the alternative embodiment kiosk of FIG. 14 from an elevated projected view with the side, top and back panels removed.
Figure 16:
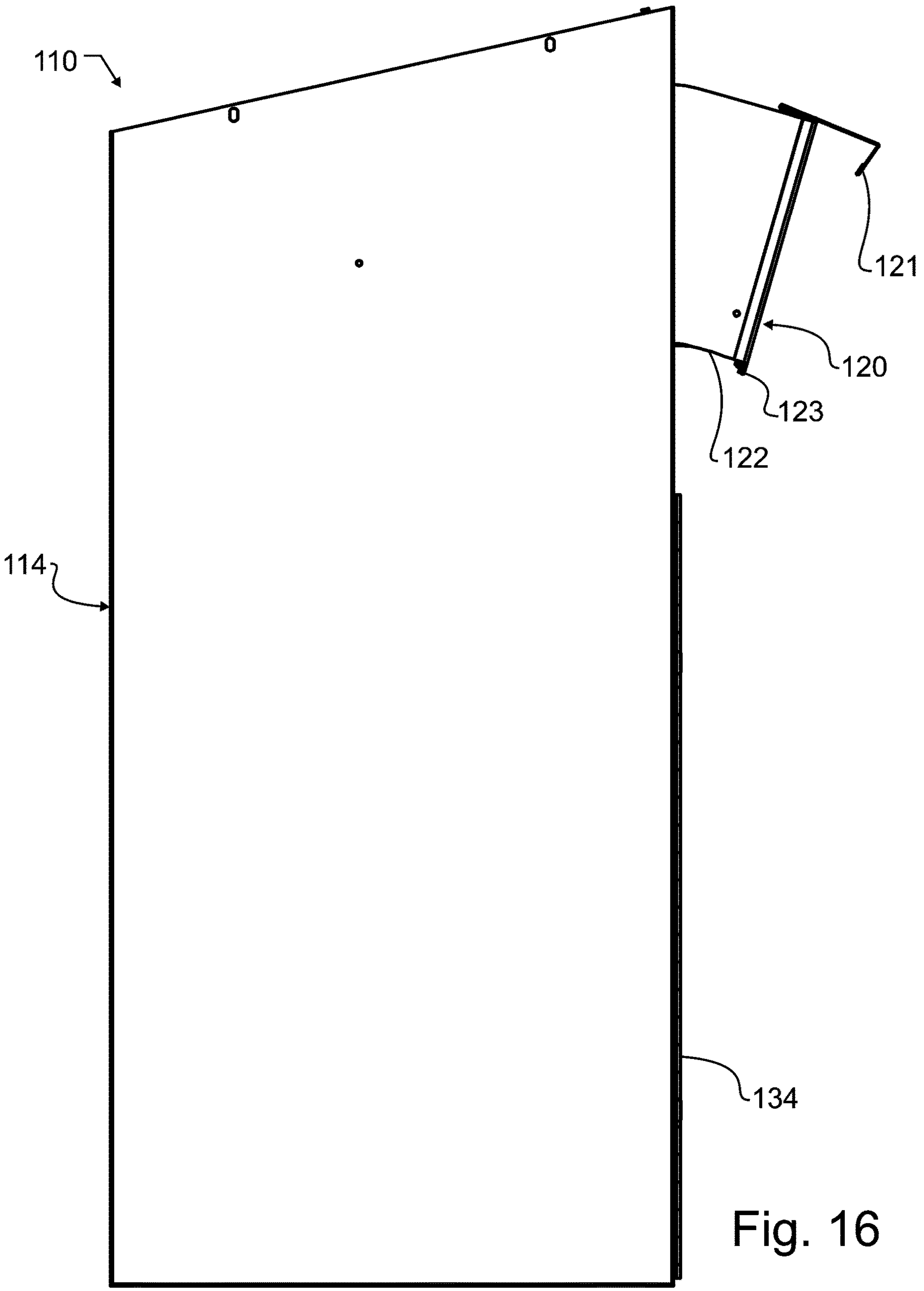
FIG. 16 illustrates the alternative embodiment kiosk of FIG. 14 from a side view.

The curved profile towards the back of hopper baffle 22, identified in FIG. 6 as hopper baffle cam surface 29, provides a means of controlling the precise positioning of hopper baffle 22 at various points through the process of opening hopper 20. In other words, by proper shaping of hopper baffle cam surface 29, the interaction between cam surface 29 and any one of hopper baffle pins 23 to engage with cam surface 29 allows the opening into secured internal kiosk storage vault 18 to be occluded faster than would occur with a hopper baffle pin 23 engaging a straight baffle when the hopper is being opened.

Hopper 20 will rotate open until a pin, peg, bolt, or other suitable apparatus positioned in one of the hopper stops 26 contacts kiosk front 12. The placement of a pin or peg into one of the hopper stops 26 permits selective control over the extent that hopper 20 will open, in turn limiting the size of an article that may be deposited within the hopper. This allows a person setting up or servicing kiosk 10 to select the hopper opening size suitable for a particular application. For exemplary and non-limiting purpose, if kiosk 10 is configured to only accept unused prescription pill bottles, the hopper opening can be quite small, such as only a few inches. In contrast, if sharps containers and other medical waste are accepted, a larger hopper opening will be required and can be selected.

While hopper 20 is held open, a person will place medications into hopper 20, and then either push hopper handle 21 back towards front 12 or simply release hopper handle 21 and allow gravity to close the hopper. When hopper 20 makes it close to the start or closed position illustrated in FIGS. 1-9, hopper lid stop 24 prevents access to the top of hopper 20, and when hopper 20 makes it back to the fully closed position, hopper baffle 22 is back to the open position illustrated in FIG. 6 that allows the deposited medication to drop into secured internal kiosk storage vault 18, preferably into a suitable awaiting receptacle and liner such as disclosed in our co-pending application Ser. No. 16/556,949, entitled "Take-Back Liner and Take-Back Kit Therefrom" incorporated herein above by reference.

The insertion of controlled medications, sharps, or other materials will continue for a period of time that may be determined by an emptying schedule, or for an indeterminate time period. When desired to empty kiosk 10, persons authorized to access contents secured within secured internal kiosk storage vault 18 begin by unlocking upper and lower locks 31, 32 on door 30. As they rotate the locks from locked to unlocked position, they will preferably observe door panel 33 moving forward relative to front 12, owing to the relaxing of the bolt arm 36 engagement with cam slot 35. Then they swing open door panel 33 about door hinge 34, remove the liner, place a new liner inside kiosk 10, close door 30, and again lock both locks 31, 32.

One common cause for kiosk failure in the prior art is generically referred to as user error. Exemplary user errors that can each lead to kiosk failure include: improperly placing the receptacle; failing to secure and properly lock the receptacle door; and failing to timely empty the kiosk. Designing to reduce the opportunity for these errors reduces the likelihood that a hazmat team or law enforcement investigation will be required, and thereby reduces the overall cost of the kiosk.

In the present invention, and as noted above, a well-designed receptacle such as disclosed in our co-pending patent application incorporated by reference herein above will reduce the likelihood that a person will improperly place the receptacle or components thereof. Also as noted herein above, the extra clearance within insertion point 37 for bolt arm 36 permits quick and less precise positioning to start the locking process. When bolt arm 36 is fully rotated and thereby locking either or both of locks 31, 32, door panel 33 is pulled into tight alignment with adjacent front 12 through the cam action of the movement of bolt arm 36 from the wider insertion point 37 into the narrower and inset position 38, thereby providing visual confirmation of proper closure and locking. This helps to ensure that the locks 31, 32 have been properly engaged.

With regard to timely emptying of the kiosk, in some alternative embodiments a visual, sonar, mechanical, or other suitable type of sensor is provided to detect the fill level of the liner or receptacle. In some embodiments, when the level is at or near a predetermined maximum, an automatic mechanically or electrically engaged lock prevents hopper 20 from opening until secured internal kiosk storage vault 18 has been emptied. In some embodiments, when the level is at or near a predetermined maximum, an alarm or other suitable indicator will be triggered. Exemplary level indicators and level detectors that may be used to trigger the hopper lock, alarm, or other indicator are known in the present and related arts and additionally taught in the U.S. patents and published applications incorporated by reference herein above, including: U.S. Pat. No. 4,971,244 by Friedman; U.S. Pat. No. 5,695,113 by Rau et al; U.S. Pat. No. 5,950,919 by Adams; U.S. Pat. No. 6,050,485 by Brito; U.S. Pat. No. 6,831,558 by Andrew; U.S. Pat. No. 6,879,255 by Jezierski; U.S. Pat. No. 7,428,980 by Irwin et al; U.S. Pat. No. 7,843,340 by Davis; and 2012/0004761 by Madruga.

Figure 2:
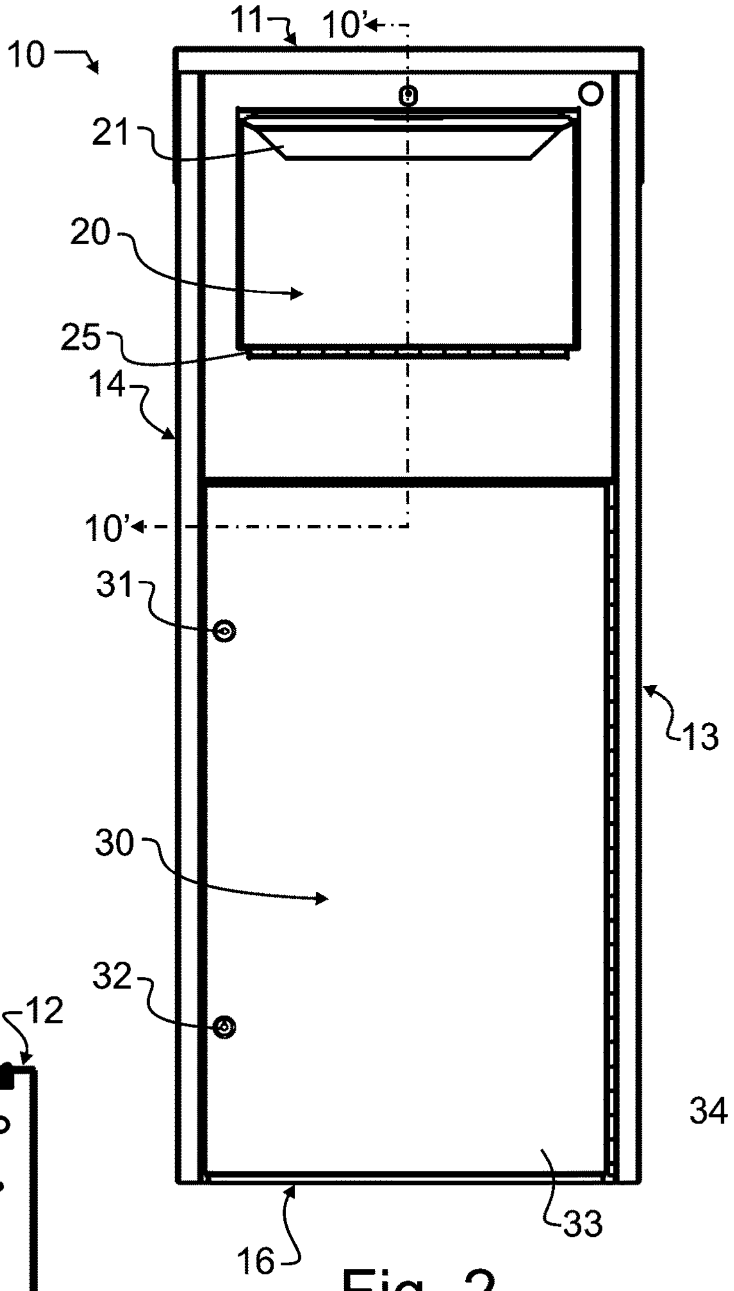
Figure 3:
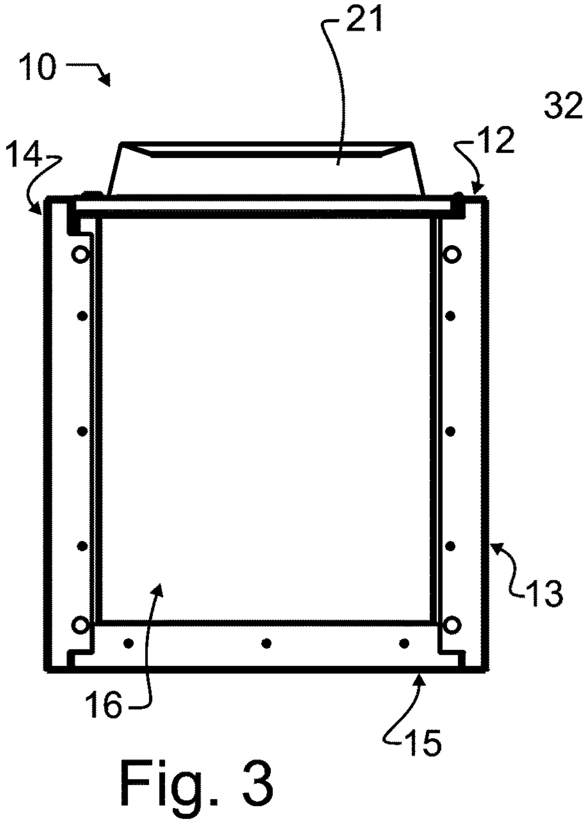
Figure 7:
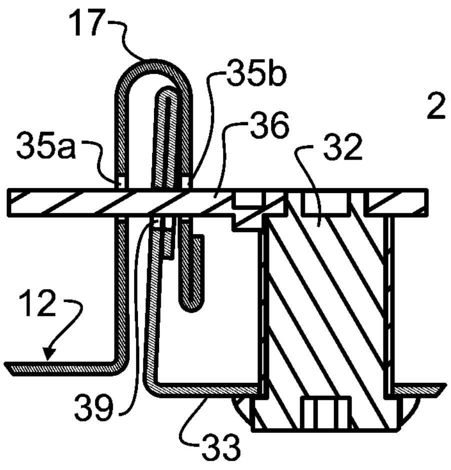
FIG. 7 illustrates the preferred embodiment lock, cam, door, and front panel from a sectioned and enlarged view taken along section line 7' in FIG. 6.
Figure 4:
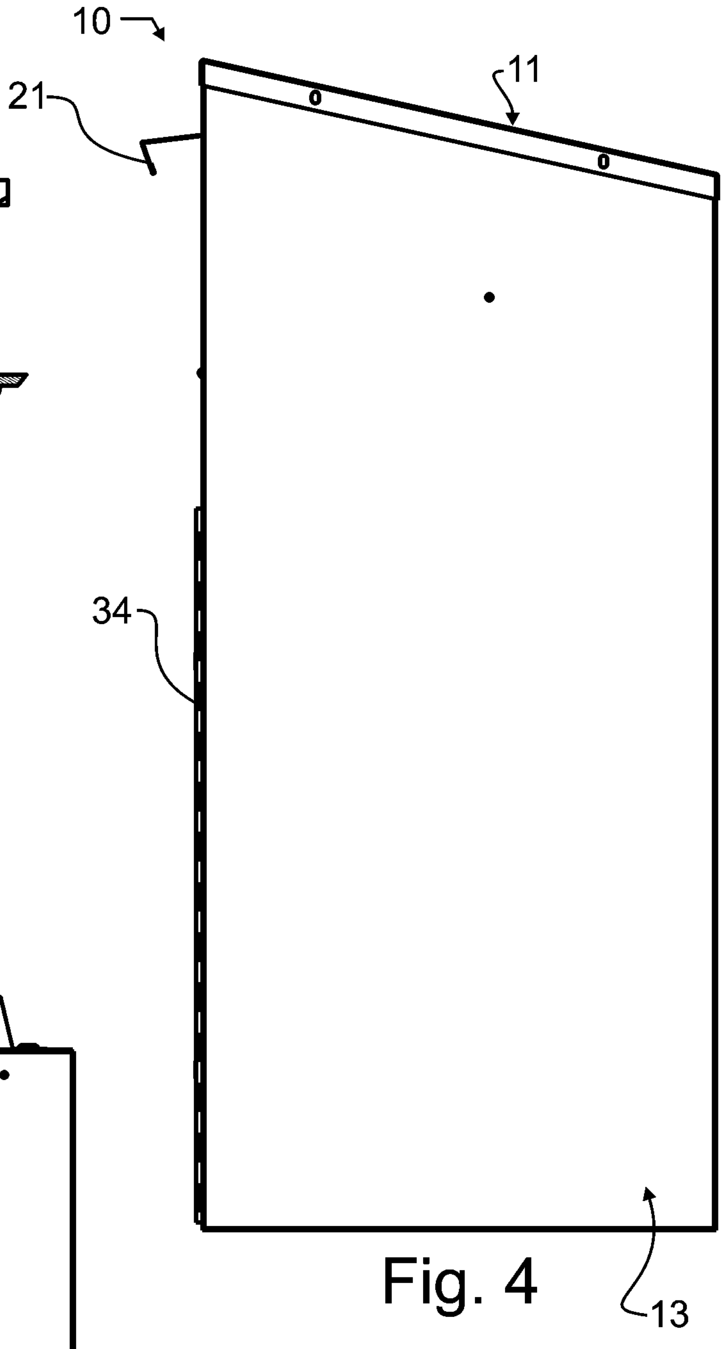
Figure 5:
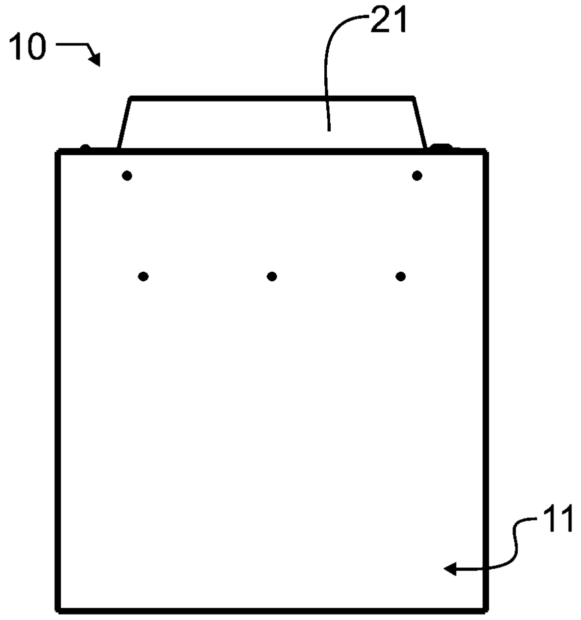
Figure 8:
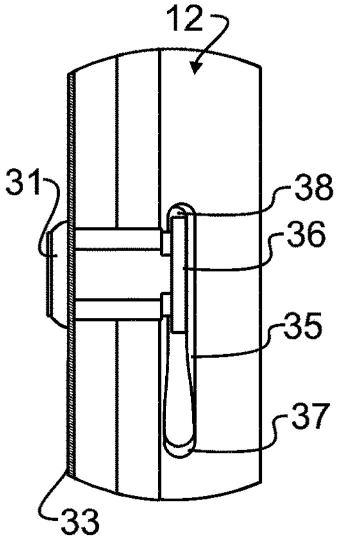
FIG. 8 illustrates the preferred embodiment lock, cam, door, and front panel from a sectioned and enlarged view taken along section line 8' in FIG. 6.

FIGS. 10-13 illustrate kiosk 10 from a sectioned and enlarged view taken along section line 10' in FIG. 2 and illustrating sequential opening of the intake hopper, and including a very slightly modified hopper. The hopper baffle cam surface 29 continues to provide a means of controlling the precise positioning of hopper baffle 22 at various points through the process of opening hopper 20. However, in some alternative embodiments instead of a baffle pin 23, a hopper anti-friction roller 28 is provided to engage with cam surface 29. In addition, hopper opening adjustment plate 40 may be affixed using hopper opening adjustment plate affixing members 44 to hopper 20 through one or more of hopper stops 26. Hopper adjustment plate 40 carries hopper opening plate stop 42, which engages with front stop 19 to control the extent that hopper 20 will open, in turn limiting the size of an article that may be deposited within the hopper. This allows a person setting up or servicing kiosk 10 to select the hopper opening size suitable for a particular application. For exemplary and non-limiting purpose, if kiosk 10 is configured to only accept unused prescription pill bottles, the hopper opening can be quite small, such as only a few inches. In contrast, if sharps containers and other medical waste are accepted, a larger hopper opening will be required and can be selected. In this embodiment of FIGS. 10-13, such adjustment is controlled by changing where hopper opening adjustment plate affixing members 44 are affixed to hopper 20.

In contrast to the minor hopper modification illustrated in FIGS. 10-13, FIGS. 14-18 illustrate a separate and very distinct alternative embodiment designed in accord with the present invention. The embodiments are distinguished by the hundreds digit, and various components within each of the preferred embodiment kiosk 10 and alternative embodiment kiosk 110 designated by the ones and tens digits.

However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

FIGS. 14 through 18 illustrate first alternative embodiment kiosk 110 which is similar in construction and functionality to kiosk 10 except for the workings of hopper 120. Hopper 120 on kiosk 110 rotates about a lower pivot on hopper hinge 125, and hopper baffle 122 is located on the bottom of hopper 120. Hopper baffle hinge 123 is affixed to the lower front side of hopper 120. When hopper 120 is closed, hopper baffle hinge 123 is immediately adjacent to front 112, and so hopper baffle 122 is free to rotate to a nearly vertical orientation, dropping the contents of hopper 120 down into secured internal kiosk storage vault 118. When hopper 120 is moved away from the front 112 by a person pulling on hopper handle 121, hopper baffle hinge 123 is pulled away from parallel to front 112, thereby almost instantaneously forcing hopper baffle 122 to rotate upward through a nearly 90 degree arc to a nearly horizontal orientation.

Figure 17:
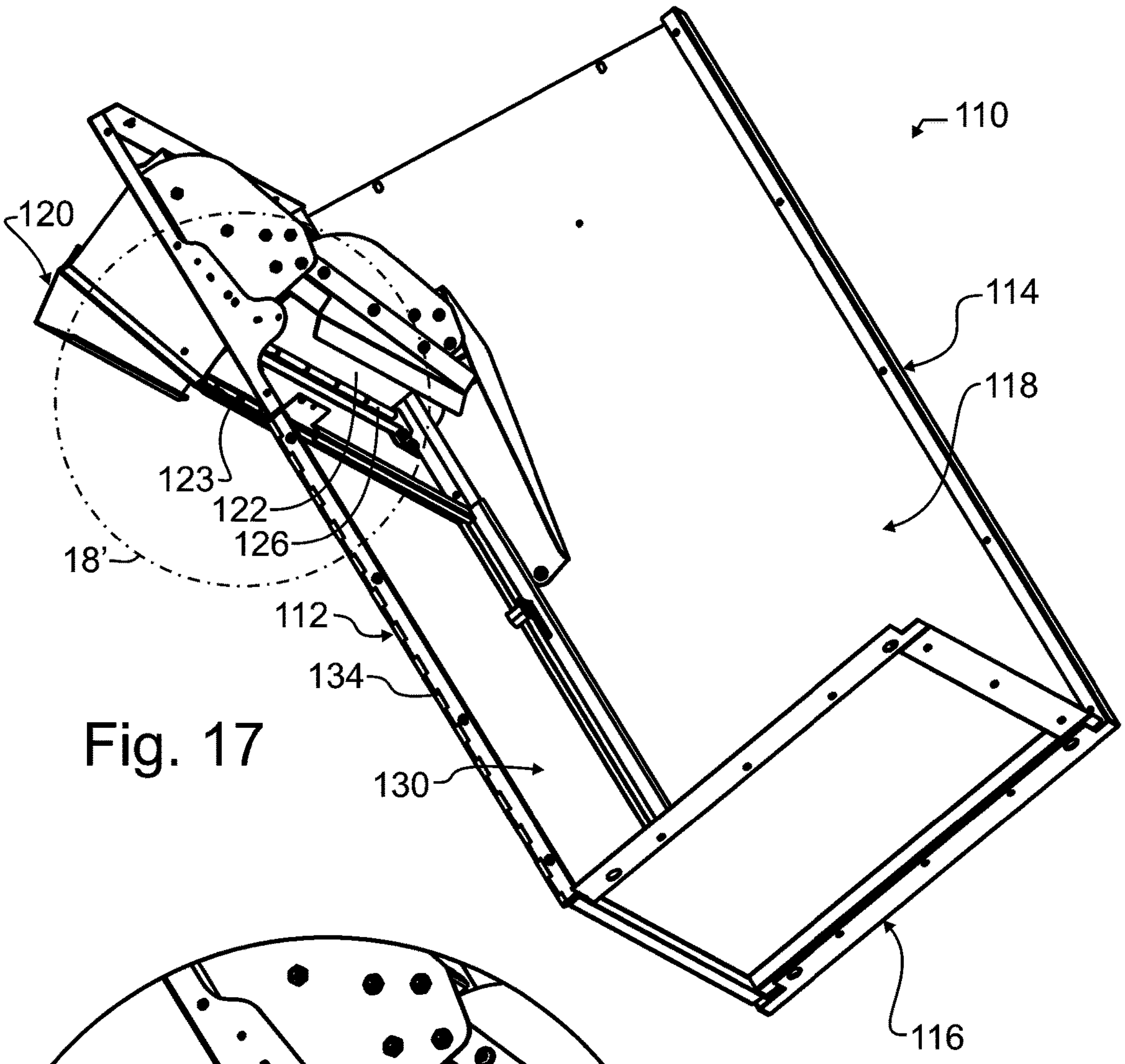
FIG. 17 illustrates the alternative embodiment kiosk of FIG. 14 from a bottom and side projected view with the side, top and back panels removed.
Figure 18:
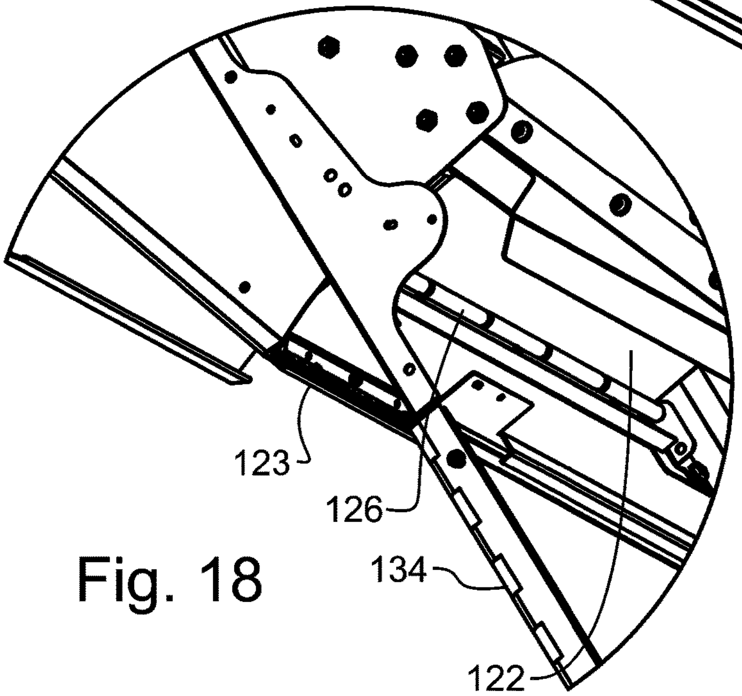
FIG. 18 illustrates the lower side of the hopper and hopper baffle used in the alternative embodiment kiosk of FIG. 14 from an enlarged and sectioned view taken along line 18' of FIG. 17.

Stated in other words, this upward rotation about the pivot created by hopper baffle hinge 123 is generated by hopper baffle 122 being suspended only on one edge by hopper baffle hinge 123 when hopper 120 is closed, and on both hopper baffle hinge 123 and an edge adjacent to front 112 distal to hopper baffle hinge 123 when opened. While not essential to proper operation of the invention, in the first alternative embodiment kiosk 110 a hopper baffle roller 126 such as best visible in FIGS. 17 and 18 is located at the bottom of the opening for hopper 120, which provides nearly frictionless movement of hopper baffle 122. Hopper 120 closes, and remains closed until hopper 120 has moved back into the front 112 and releases the contents of hopper 120 preferably into an awaiting receptacle and liner within secured internal kiosk storage vault 118.

Preferably, a maximum possible hopper opening size will be equal to or less than the opening in the bottom of hopper 120 created when hopper baffle 122 drops into a downward, and therefore most vertical, orientation. This allows for selection of an ideal opening size while still ensuring deposited medications do not remain in the hopper 120 when hopper 120 is closed.

From the foregoing figures and description, several additional features and options become more apparent. First of all, the interior of hoppers 20, 120 are preferably designed to be as smooth as possible, which reduces the possibility that articles deposited therein will get caught and not be deposited into an interior receptacle or liner. In addition, kiosks 10, 110 may be manufactured from a select variety of metals, most preferably including metals such as steel or stainless steel, and other impact, abrasion, and heat resistant metals or materials. The specific thickness of the metal used may vary, though special benefits are attainable if several important factors are taken into consideration such as impact resistance, work hardening, durability, and heat resistance of the specific metal chosen. The more resistant to tampering attempts the material is, the less material that will be required, especially as different components of kiosk 10 may require more or less strength to be tamper resistant or have more or less access points for tools to be inserted and apply destructive force therein.

While the foregoing details what is felt to be the preferred and additional alternative embodiments of the invention, no material limitations to the scope of the claimed invention are intended. The variants that would be possible from a reading of the present disclosure are too many in number for individual listings herein, though they are understood to be included in the present invention. Further, features and design alternatives that would be obvious to one of ordinary skill in the art are considered to be incorporated herein. The scope of the invention is set forth and particularly described in the claims herein below.

We claim:

1. A controlled substance take-back kiosk, comprising:

a housing defining an exterior space and an interior space, said interior space having a secured internal kiosk storage vault;

a hopper selectively moveable between a normally closed position disallowing insertion of controlled substances into said interior space of said housing and an open position allowing insertion of said controlled substances into said interior space;

at least one hopper baffle pin coupled with said hopper and moveable therewith;

a hopper baffle that obstructs access through said hopper to said secured internal kiosk storage vault while said hopper is in said open position and allows discharge of objects from said hopper to said secured internal kiosk storage vault when said hopper is in said normally closed position; and a non-linear baffle cam surface rigidly affixed with said hopper baffle and configured to engage with said at least one hopper baffle pin so that rotation of said hopper drives movement of said hopper baffle pin, which in turn pivots said hopper baffle in an amount determined by a slope of said non-linear baffle cam surface in contact with said at least one hopper baffle pin.

2. The controlled substance take-back kiosk of claim 1, wherein said hopper further comprises a plurality of predetermined hopper baffle pin locations, said at least one hopper baffle pin selectively coupled with said hopper through a one of said plurality of predetermined hopper baffle pin locations.

3. The controlled substance take-back kiosk of claim 1, wherein said hopper baffle cam surface precisely positions said hopper baffle throughout said movement of said hopper between said normally closed position and said open position.

4. The controlled substance take-back kiosk of claim 3, wherein said hopper baffle cam surface is configured to provide accelerated closure of said hopper baffle during movement of said hopper from said normally closed position to said open position.

5. The controlled substance take-back kiosk of claim 1, wherein said hopper baffle pin further comprises a hopper anti-friction roller configured to engage with said non-linear baffle cam surface.

6. The controlled substance take-back kiosk of claim 1, further comprising at least one hopper stop moveable with said hopper and configured to engage a kiosk front stop and thereby limit the extent that said hopper opens.

7. The controlled substance take-back kiosk of claim 6, wherein said hopper further comprises a plurality of predetermined hopper stop locations, said at least one hopper stop selectively coupled with said hopper through a one of said plurality of predetermined hopper stop locations.

8. The controlled substance take-back kiosk of claim 1, further comprising:

a vault door moveable between a normally closed position disallowing access to said secured internal kiosk storage vault, and an open position allowing access to said secured internal kiosk storage vault; and at least one lock configured to secure said vault door in said normally closed position.

9. A controlled substance take-back kiosk, comprising:

a housing defining an exterior space and an interior space and a vault doorjamb, said interior space having a secured internal kiosk storage vault and said vault doorjamb having at least one doorjamb cam slot;

a hopper selectively moveable between a normally closed position disallowing insertion of controlled substances into said interior space of said housing and an open position allowing insertion of said controlled substances into said interior space;

a baffle that obstructs access through said hopper to said secured internal kiosk storage vault while said hopper is in said open position and allows discharge of objects from said hopper to said secured internal kiosk storage vault when said hopper is in said normally closed position;

a vault door moveable between a normally closed position disallowing access to said secured internal kiosk storage vault, and an open position allowing access to said secured internal kiosk storage vault, said vault door having at least one door cam slot;

at least one lock having a rotating bolt arm that swings into said at least one door jamb cam slot and into said at least one door cam slot, said at least one lock thereby configured to secure said vault door in said normally closed position.

10. The controlled substance take-back kiosk of claim 9, wherein said vault doorjamb further comprises a U-shape, and said at least one door jamb cam slot comprises a pair of spaced apart and aligned doorjamb cam slots on said U-shaped vault door jamb.

11. The controlled substance take-back kiosk of claim 10, wherein said at least one door cam slot is aligned with said pair of spaced apart and aligned doorjamb cam slots when said vault door is in said normally closed position.

12. The controlled substance take-back kiosk of claim 11, wherein said rotating bolt arm extends through said at least one door cam slot and said pair of spaced apart and aligned doorjamb cam slots when said vault door is in said normally closed position and said at least one lock is configured to secure said vault door.

13. The controlled substance take-back kiosk of claim 12, wherein at least one of said at least one door cam slot and said pair of spaced apart and aligned door jamb cam slots are wider on one end and narrower on the other, whereby as said rotating bolt arm rotates from an unlocked position to a locked position, said vault door is pulled snugly adjacent to said U-shaped vault doorjamb.

14. The controlled substance take-back kiosk of claim 12, wherein said rotating bolt arm decreases in thickness with increasing radius, whereby as said rotating bolt arm rotates from an unlocked position to a locked position, said vault door is pulled snugly adjacent to said U-shaped vault doorjamb.

15. The controlled substance take-back kiosk of claim 9, wherein said at least one lock further comprises two locks, a one of said two locks actuated by a unique key different from a key used to actuate the other of said two locks.

16. The controlled substance take-back kiosk of claim 9, further comprising:

at least one hopper baffle bin coupled with said hopper and moveable therewith;

a hopper baffle cam surface affixed to and moveable with said baffle;

said at least one hopper baffle pin configured to engage with said hopper baffle cam surface and thereby move said baffle when said hopper is selectively moved between said normally closed position and said open position.

17. The controlled substance take-back kiosk of claim 16, wherein said hopper further comprises a plurality of predetermined hopper baffle pin locations, said at least one hopper baffle pin selectively coupled with said hopper through a one of said plurality of predetermined hopper baffle pin locations.

18. The controlled substance take-back kiosk of claim 16, wherein said hopper baffle cam surface precisely positions said hopper baffle throughout said movement of said hopper between said normally closed position and said open position.

19. The prescription medication take-back kiosk of claim 16, wherein said hopper baffle cam surface is configured to provide accelerated closure of said hopper baffle during movement of said hopper from said normally closed position to said open position.

20. A prescription medication take-back kiosk, comprising a housing defining an exterior space and an interior space and a vault doorjamb, said interior space having a secured internal kiosk storage vault and said vault doorjamb having at least one doorjamb cam slot;

a hopper selectively moveable between a normally closed position disallowing insertion of controlled substances into said interior space of said housing and an open position allowing insertion of said controlled substances into said interior space;

at least one hopper baffle pin coupled with said hopper and moveable therewith;

a hopper baffle that obstructs access through said hopper to said secured internal kiosk storage vault while said hopper is in said open position and allows discharge of objects from said hopper to said secured internal kiosk storage vault when said hopper is in said normally closed position;

a non-linear baffle cam surface rigidly affixed with said hopper baffle and configured to engage with said at least one hopper baffle pin so that rotation of said hopper drives movement of said hopper baffle pin, which in turn pivots said hopper baffle in an amount determined by a slope of said non-linear baffle cam surface in contact with said at least one hopper baffle pin;

a vault door moveable between a normally closed position disallowing access to said secured internal kiosk storage vault, and an open position allowing access to said secured internal kiosk storage vault, said vault door having at least one door cam slot; and at least one lock having a rotating bolt arm that swings into said at least one door jamb cam slot and into said at least one door cam slot, said at least one lock thereby configured to secure said vault door in said normally closed position.

* * * * *